United States Patent [19]

Chao

[11] Patent Number: 5,131,055

[45] Date of Patent: Jul. 14, 1992

[54] AUTO AND HETERO-ASSOCIATIVE MEMORY USING A 2-D OPTICAL LOGIC GATE

[75] Inventor: Tien-Hsin Chao, Valencia, Calif.

[73] Assignee: The United States of America as represented by the Administrator of the National Aeronautics and Space Administration, Washington, D.C.

[21] Appl. No.: 481,013

[22] Filed: Feb. 16, 1990

[51] Int. Cl.⁵ .............................................. G06K 9/74
[52] U.S. Cl. ........................................ 382/32; 382/31;
 365/49; 359/107; 359/108; 359/559; 359/561
[58] Field of Search .............................. 364/513, 822;
 350/162.12, 162.13; 365/49, 125; 382/14, 16,
 31, 32, 34, 42, 49

[56] References Cited

U.S. PATENT DOCUMENTS

| | | | |
|---|---|---|---|
| 3,602,887 | 8/1971 | Chow | 382/31 |
| 3,668,635 | 6/1972 | Mizobuchi | 382/31 |
| 4,558,462 | 12/1985 | Horiba et al. | 382/42 |
| 4,837,843 | 6/1989 | Owechko | 382/31 |
| 4,862,511 | 8/1989 | Peppers et al. | 382/32 |
| 5,014,327 | 5/1991 | Potter et al. | 382/34 |
| 5,023,833 | 6/1991 | Baum et al. | 365/49 |

OTHER PUBLICATIONS

E. B. Baum, J. Moody and F. Wilczek, "Internal Representations for Associative Memory", Biological Cybernetics, 59, 217-288 (1988).

R. P. Lippmann, "An Introduction to Computing with Neural Nets", IEEE ASSP Magazine, pp. 4-22, Apr. 1987.

*Primary Examiner*—Jose L. Couso
*Attorney, Agent, or Firm*—Thomas H. Jones; John R. Manning; Guy M. Miller

[57] ABSTRACT

An optical system for auto-associative and hetero-associative recall utilizing Hamming distance as the similarity measure between a binary input image vector $V^{(k)}$ and a binary image vector $V^{(m)}$ in a first memory array using an optical Exclusive-OR gate for multiplication of each of a plurality of different binary image vectors in memory by the input image vector. After integrating the light of each product $V^{(k)} \times V^{(m)}$, a shortest Hamming distance detection electronics module determines which product has the lowest light intensity and emits a signal that activates a light emitting diode to illuminate a corresponding image vector in a second memory array for display. That corresponding image vector is identical to the memory image vector $V^{(m)}$ in the first memory array for auto-associative recall or related to it, such as by name, for hetero-associative recall.

4 Claims, 4 Drawing Sheets

AUTO AND HETERO-ASSOCIATIVE MEMORY USING A 2-D OPTICAL LOGIC GATE

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to an optical associative memory system suitable for both auto- and hetero-associative recall utilizing Hamming distance as the similarity measure between a binary input and a memory image. Based on the Hamming distance measurement, this optical associative memory performs a nearest neighbor search and the result is displayed in real-time.

BACKGROUND ART

Self-organization and collective computation capability are the distinctive advantages of neural nets as compared with the conventional signal processing. One of the most important neural net models is the associative memory. Among all the associative memory models, the Hopfield neural net model has been proven to be suitable for optical implementation. Architectures proposed for the optical implementation of the Hopfield model include vector matrix multiplier models. D. Psaltis and N. Farhat, "Optical Information Processing Based on an Associative-Memory Model for Neural Nets with Thresholding and Feedback," Opt. Lett. 10, 98 (1985); N. Farhat, D. Psaltis, A. Prata and E. Paek, "Optical Implementation of the Hopfield Model," Appl. Opt. 24, 1469 (1985). Other architectures include holographic correlator models. B. H. Soffer, G. H. Dunning, Y. Owechiko and E. Marom, "Associative Holographic Memory with Feedback Using Phase-conjugating Mirrors," Opt. Lett. 11, 118 (1986); E. G. Pack and D. Psaltis, "Optical Associative Memory Using Fourier Transform Holograms," Opt. Eng. 26, 433 (1987).

There are several basic limitations associated with the Hopfield associative memory model. In the Hopfield neural net, the weights of the interconnection matrix are formulated by summing up the outer product of each of the memory vectors. The stable states produced by the iterative multiplication, thresholding and feedback may represent only local minima of the energy landscape associated with the system. Thus, spurious states may be obtained as the result of the associative recall. B. L. Montgomery and B. V. K. Vijaya Kuman, "Evaluation of the Use of the Hopfield Neural Network Model as a Nearest-neighbor Algorithm," Appl. Opt. 25, 3759 (1986). The performance of the Hopfield model also starts to deteriorate as the number of stored memory images increase beyond the limit of $M \leq 0.15\ N$, where M is the number of the stored images and N is the number of neurons.

The Hopfield neural network model is generally suitable for auto-associative recall. To conduct a hetero-associative recall, the system has to be modified to have a bidirectional structure that allows forward and backward information flow for two-way associative search. C. C. Guest and R. Tekolste, "Design and Devices for Optical Bidirectional Associative Memories," Appl. Opt. 26, 5055 (1987). The present invention introduces an innovative concept of an optical associative memory. The system performs a noniterative nearest neighbor search based on the shortest Hamming distance measurements between an input and each of the stored images. This optical feedforward network produces no spurious state and is suitable for both auto-associative and hetero-associative recalls. Moreover, high system storage capacity can be obtained since this capacity is only limited to the space-bandwidth product of the spatial light modulators utilized in the associative memory.

STATEMENT OF THE INVENTION

In accordance with the present invention, an optical associative memory for auto-associative and hetero-associative recall utilizes Hamming distance as the similarity measure between an input binary image vector $V^{(k)}$ and a memory image vector $V^{(m)}$ by multiplication in a two-dimensional (2-D) optical Exclusive-OR (XOR) gate and a shortest Hamming distance detector in an electronics module. The image input vector $V^{(k)}$ is multiplied with a number of stored image vectors $V^{(m)}$ in memory by the XOR gate which includes means for replication of the input vector $V^{(k)}$ into a plurality of image vectors, one for each memory vector stored in memory. An Exclusive-OR function is then carried out in parallel between the replicated input image vector $V^{(k)}$ and each of the stored image vectors $V^{(m)}$ using a lens system which may be a single lens or an array of small lenses, one for each of the image vectors $V^{(m)}$ stored in memory.

The Exclusive-OR image outputs of the lens system are separately detected and the shortest Hamming distance is detected among the image outputs by integrating the light of each image output separately in an array of photodetectors, one photodetector for each image output, and comparing the output signal amplitude of each photodetector with the output signal amplitude of all other photodetectors of the array to determine which has the lowest amplitude. The signal having the lowest amplitude is then employed to activate one of an array of light emitting diodes (LEDs), one LED for each stored image vector $V^{(m)}$. That activated LED illuminates the corresponding one of the stored image vectors in a recall memory used to produce an output image vector for display, which may be the same as the image vector stored in the XOR gate for auto-associative recall, such as a person's face, or some identification of that image vector, such as the person's name, for hetero-associative memory recall.

BRIEF DESCRIPTION OF THE DRAWINGS

FIG. 3b illustrates the replication of the first (upper left) image vector of FIG. 3a for comparisons of each replicated image with a stored image shown in FIG. 3a.

FIG. 3c illustrates the replication of the second (upper right) image vector of FIG. 3a for comparison of each replicated image with a stored image shown in FIG. 3a.

DETAILED DESCRIPTION OF THE INVENTION

Hamming distance is the total of different bits between two binary vectors under comparison and perhaps is the best-known measure of similarity. Thus, the Hamming distance between two binary vectors can be measured by using the Exclusive-OR (XOR) function for the comparison of vectors. In neural networks, 'learning' the Exclusive-OR has been the classic difficult problem because it is a nonlinearity separable problem. This learning can be done by training a hidden unit of a multilayer neural net. D. E. Rumelhart, G. E. Hinton and R. J. Williams, "Learning Internal Representations by Error Propagation," *Parallel Distributed Processing*, (MIT Press, Cambridge, Mass. 1986). However, the training may require thousands of iterations of the fast learning rules.

Exclusive-OR with much higher speed can also be implemented with high-order neural networks. C. Lee Giles and T. Maxwell, "Learning, Invariance, and Generalization in High-order Neural Networks," Appl. Ocp. 26, 4972 (1987). However, optical implementation of a high-order neural net is a much more involved problem. Consequently, the present invention utilizes an optical XOR gate to perform the Hamming distance measure. The advantage of using an optical XOR gate is that it is suitable for the processing of 2-D binary images, in one-step with a high space-bandwidth product.

Figure 1:
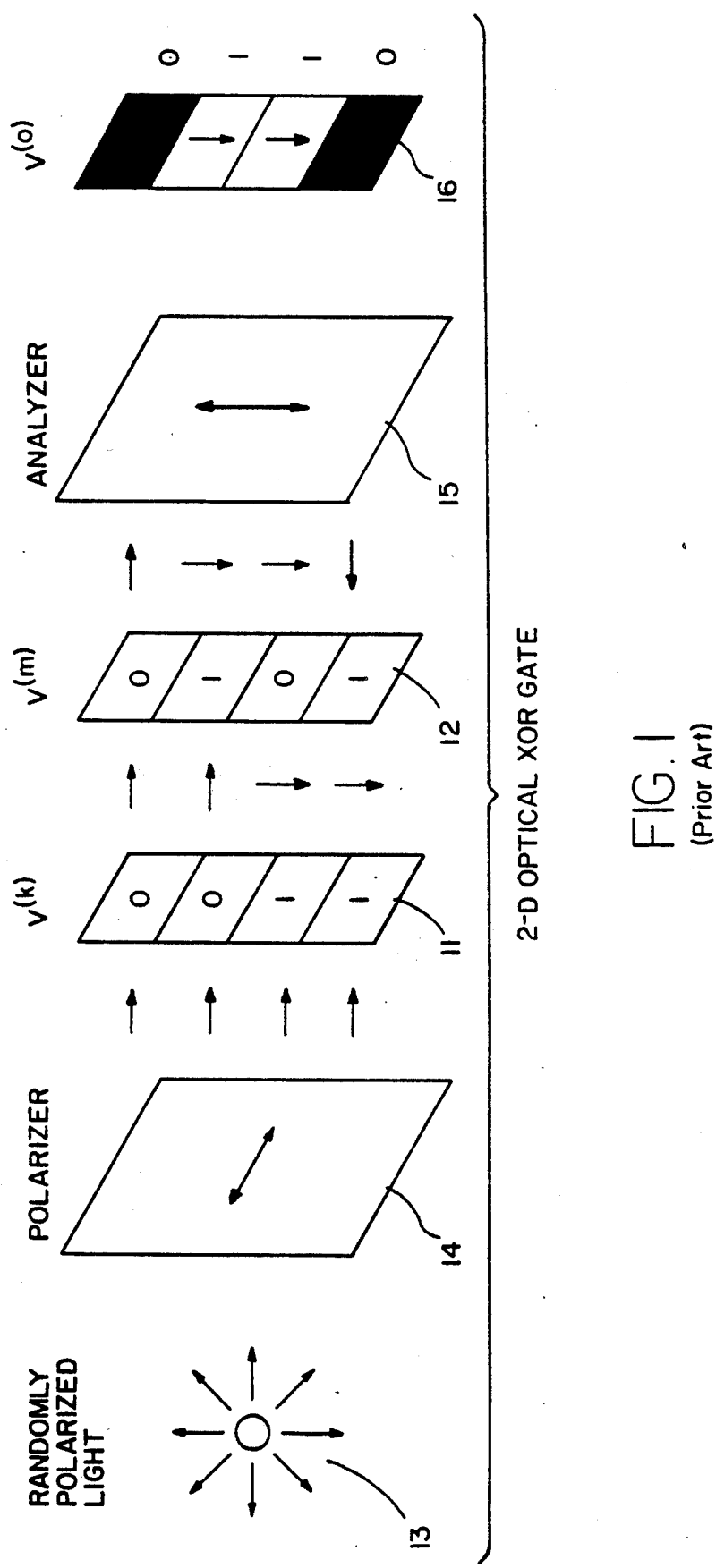
FIG. 1 illustrates schematically operation of a prior-art 2-D optical Exclusive OR (XOR) gate.

The principle of operation of a 2-D optical XOR gate is illustrated in FIG. 1. This prior-art optical XOR gate is comprised of two spatial light modulators (SLM) 11 and 12 placed in tandem. T. Kohonen, *Self-Organization and Associative Memory*, (Springer-Verlag, New York, 1982); J. J. Hopfield, "Neural Networks and Physical Systems with Emergent Collective Computational Abilities," Proc. Natl. Acad. Sci. USA 79, 2554 (1982). The requirements of the SLMs are as follows: First, these SLMs have to be based on polarization modulation (e.g., LCLV, MOD, LCTV, etc.). Second, when the input is 1, the polarization state of the light upon passing through the SLM is rotated by 90°, but when the input is 0°, the polarization state of the input light remains unchanged.

As shown in FIG. 1, two binary vectors $V^{(k)}$ and $V^{(m)}$ are stored in the two SLMs 11 and 12, respectively. The first SLM is illuminated by light from a randomly polarized source 13 that is horizontally polarized by a polarizer 14. The corresponding polarization state of light passing through each element of vectors $V^{(k)}$ and $V^{(m)}$ is directed to an analyzer 15. At the analyzer 15, light beams passing through the (0, 0) and (1, 1) vector elements are totally blocked out and result in dark states of an output vector $V^{(0)}$ at the display unit 16. Light beams passing through the (0, 1) and (1, 0) vector elements are not blocked and result in bright states in the display unit 16. This is exactly the XOR function. By loading two arbitrary binary vectors into these SLMs 11 and 12, the Hamming distance between these vectors can be instantly obtained by integrating the total exiting light beams representing the binary vector elements using an integration lens.

When the vector elements match, (0, 0) or (1, 1), the exiting light is zero, and when they do not the exiting light is one. Upon detecting this light, a binary signal is obtained from each comparison of a vector element (match=0, no match=1). Upon integrating the light beams at the display unit, the lower the intensity of the integrated light beams, the closer the match between the input vector $V^{(k)}$ and a stored vector $V^{(m)}$. The linear array of vector elements illustrated may be readily expanded to a rectangular array. What is referred to hereinafter as an image vector is therefore intended to include both linear and rectangular arrays.

Figure 2:
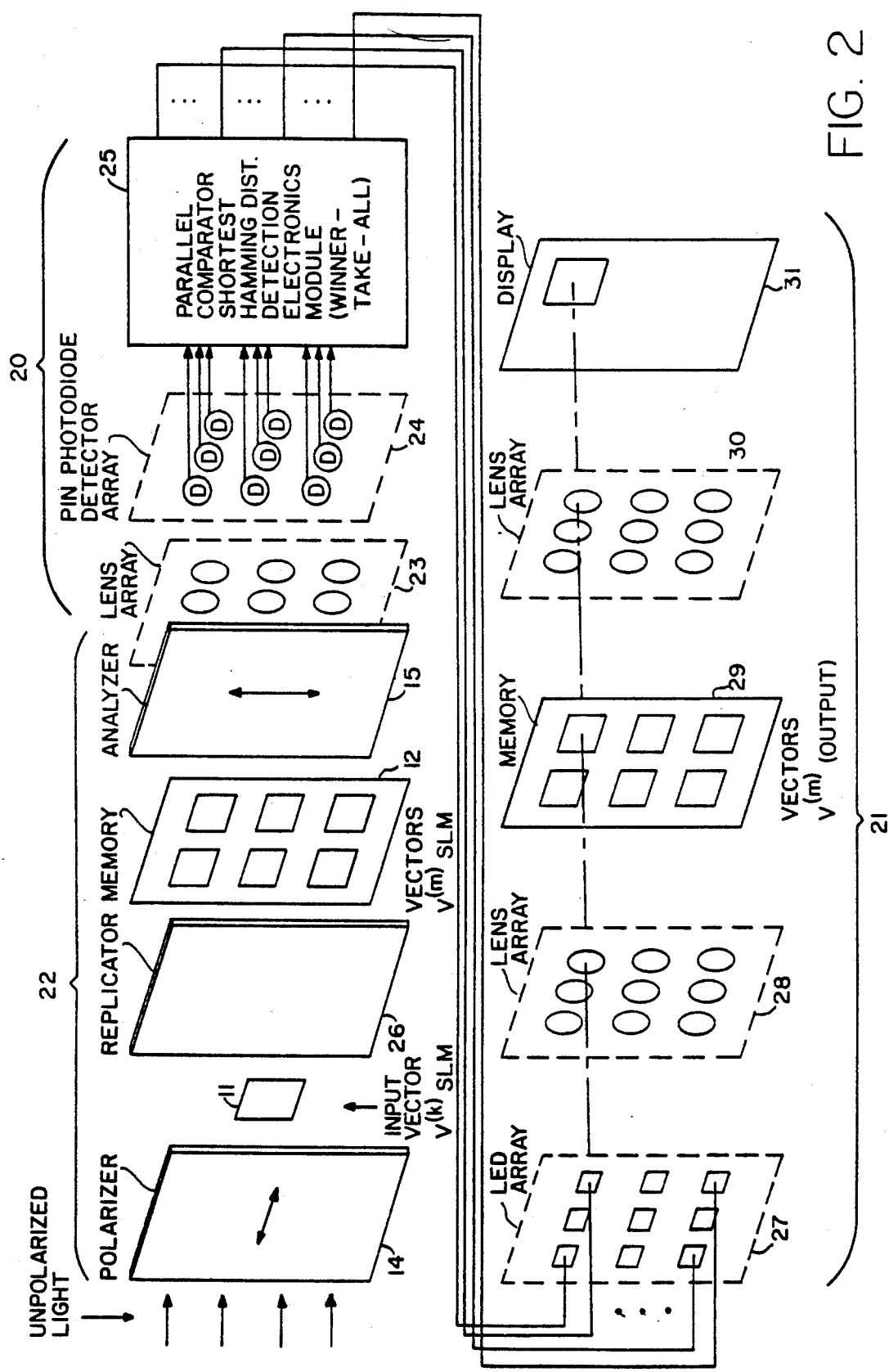
FIG. 2 illustrates schematically an optical associative memory based on the principle of operation of a 2-D optical XOR gate.

The optical associative memory shown in FIG. 2 consists of a shortest Hamming distance detection module 20, an associative recall module 21, and a 2-D optical XOR gate 22. The shortest Hamming distance detection module 20 receives its input beams from the XOR gate 22 the operation of which is as described with reference to FIG. 1. The only difference is that here a rectangular array of image vectors is illustrated in place of the linear array of vector elements shown in FIG. 1. Each image vector may itself be a rectangular image, and each rectangular image may consist of a rectangular array of a large number of pixels.

For convenience, the same reference numerals are used in FIG. 2 as in FIG. 1 for the elements 11, 12, 14 and 15 of the XOR gate 22. An integration lens array 23, a PIN photodiode detector array 24, and an electronics module 25 having a parallel comparator is provided for the shortest Hamming distance detection. That completes the shortest Hamming distance detection module 20.

In order to simultaneously compare an input image vector with a number M of stored memory image vectors, a replicator 26 is inserted between the two tandem SLMs 11 and 12 of the optical XOR gate 22. The input image vector $V^{(k)}$ is spatially multiplexed by the replicator into M identical image vectors before being multiplied by the XOR gate with the M stored image vectors. In the output plane of the integration lens 23, M light spots are present with intensities proportional to the Hamming distances between the input and the stored image vectors. These light spots are individually detected by the array 24 of photodiodes. These photodiodes linearly convert the light intensity to electrical signals. The array of parallel comparators $C_1, C_2 \ldots C_n$ in the electronics module 25 compare these M signal intensities $I_1, I_2 \ldots I_n$. The electronics module 25 outputs a high level signal (e.g., 5 volts) at an output terminal thereof associated with the photodiode of the detector array 24 having the lowest output signal, i.e., associated with the lowest light intensity input to the photodiode array 24. That is the shortest Hamming distance. Low level output signals (0 volt) will be produced at all the other output terminals. Thus, the comparators $C_1, C_2 \ldots C_n$ in the electronics module 25 will produce a binary signal that is high (5 volts) at only one comparator output terminal for the shortest Hamming distance and low (0 volts) at all other comparator output terminals. This array of comparators may be implemented with a conventional winner-take-all circuit arrangement, such as by providing lateral inhibition from each comparator to all others having a lower level output so that the comparator with the highest input will suppress the gain of all others until only the comparator having the highest input will be "on" (5 volt); all others will be "off" (0 volts). Other approaches may be used as well, the simplest of which adjusts a global threshold until only one comparator is on. Still other approaches based upon neural networks models are possible. See Richard P. Lippmann, "An Introduction to Computing with Neural Nets," IEEE ASSP Magazine, pp. 4-22, Apr. 1987.

The associative recall module 21 consists of a light emitting diode (LED) array 27, a collimating lens let array 28, a transparency 29 for storing the array of memory vectors $V^{(m)}$, an imaging lens array 30 and a display screen 31. Only the single high level output from the electronics module 25 will turn on an LED and in turn display the memory stored in the transparency image vector having the shorted Hamming distance onto the screen 31. It should be noted that since the similarity measurements among the input image vector and the stored image vectors are completed in the shortest Hamming distance detection module 20, the associative recall module only serves as a look-up table and therefore has the freedom of performing either auto-associative or hereto-associative recalls by merely substituting one transparency for another. For example, in the case of recalling human face images, the images stored for recall can be either the faces (auto-associative recall) or the names of the persons associated with the faces (hetero-associative recall). The choice of either auto or hetero-associative recall is made in loading the recall memory 29.

In the implementation of the XOR gate 22, the replicator may be implemented with a holographic element. It may also be implemented with a two-dimensional differential grating two lens system. The first lens system (a single lens), spaced at a focal distance from the input image vector $V^{(k)}$, focuses the input image vector onto the two-dimensional diffraction grating which splits the input image vector into M image vectors spaced in an array. The second lens system may be an array of lens lets or a single lens spaced a focal distance from the replicator. In either case, its purpose is to focus the M replicated image vectors onto the memory SLM array for binary multiplication of the stored image vectors with the input image vectors. The M image vectors are stored in the SLM array by electronic storage of the input signals that control the individual SLMs in the array.

Figure 4A:
FIG. 4a illustrates the result of comparison of the replicated image vector shown in FIG. 3c with stored images shown in FIG. 3a where the dark image vector signifies the best match.
Figure 4B:
FIG. 4b illustrates the auto-associative recall of the best-matched image vector.
Figure 4C:
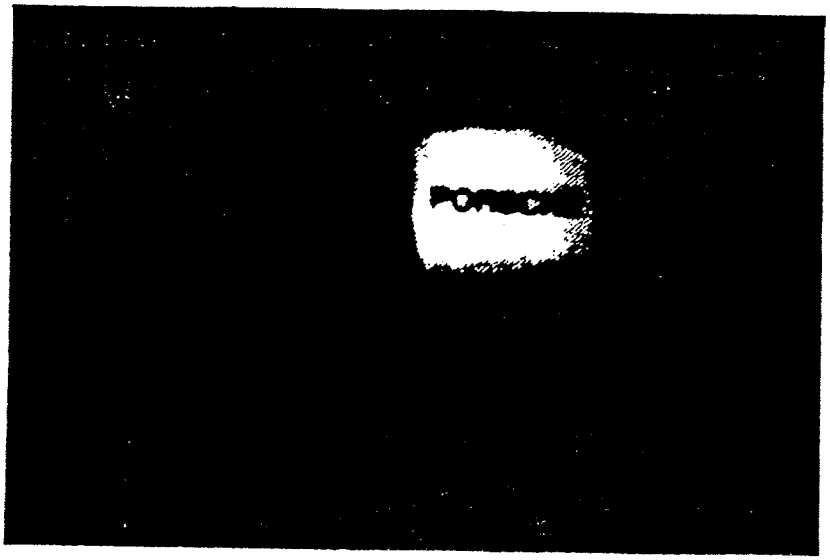
FIG. 4c illustrates the hetero-associative recall of the best-matched image vector.
Figure 3A:
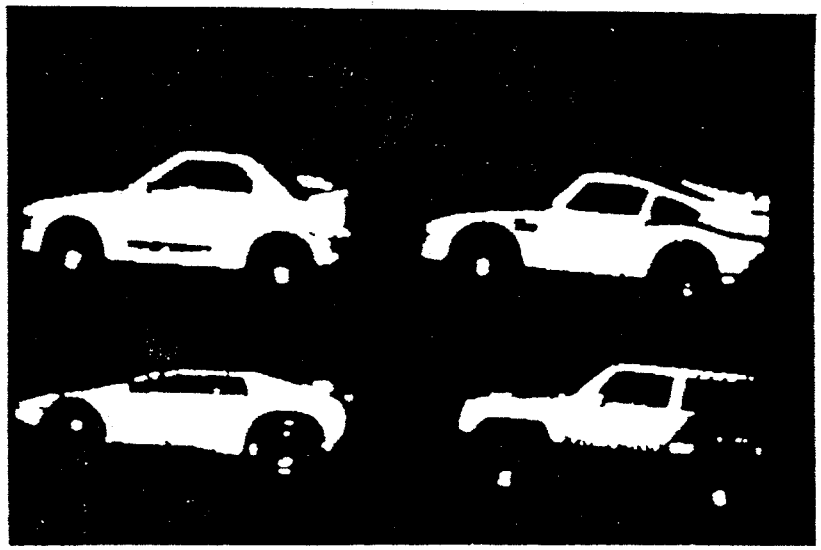
FIG. 3a illustrates the images of four different but somewhat similar automobiles stored as optical image vectors.
Figure 3B:
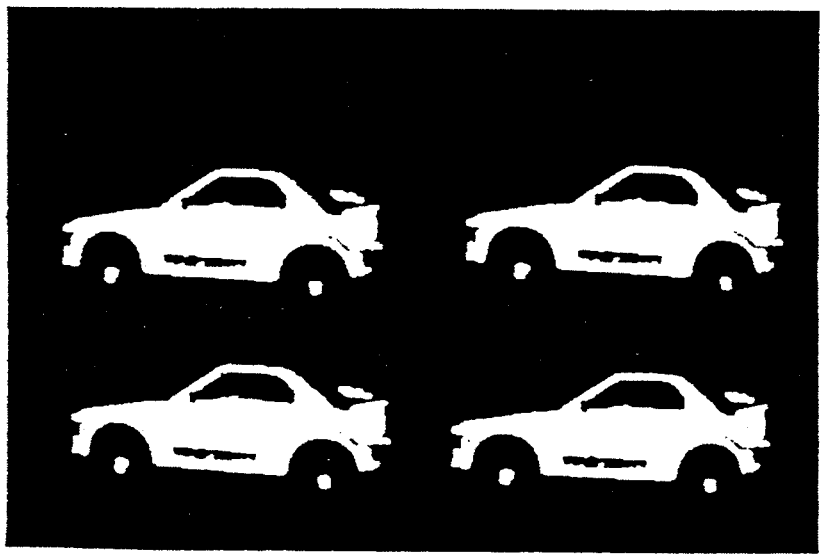
Figure 3C:
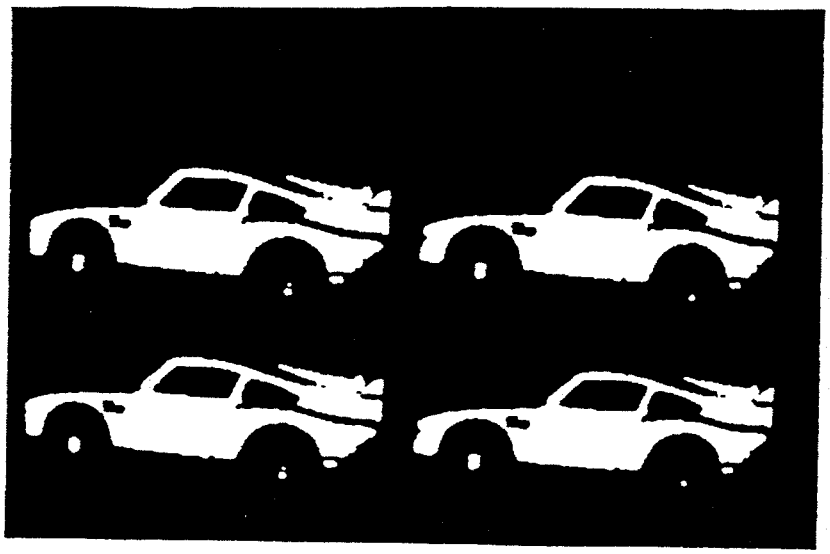

In experimental demonstrations, photographs of four model cars oriented in the same way to present left side views were used as the stored memory vector images. These cars were also numbered as objects 1 to 4, respectively, from left to right starting with the first row and continuing in the second row, as shown in FIG. 3a. In the first associative recall experiment, object 1 was replicated into four identical images as shown in FIG. 3c and fed into the optical XOR gate 22. The corresponding output images from the XOR gate comparisons of replicated object 2 images shown in FIG. 3c with images of objects 1, 2, 3 and 4 shown in FIG. 3a were all quite bright, except one which was nearly totally dark, as shown in FIG. 4a. That one was recalled from auto-associative memory and displayed as shown in FIG. 4b, and the model name was recalled from hetero-associative memory as shown in FIG. 4c. The nearly totally dark image in FIG. 4a was obviously the one with the lowest intensity and hence the shortest Hamming distance. The image of object 1 was similarly replicated into four identical images as shown in FIG. 3b and fed into the optical XOR gate 22 for comparison with the same success. Then the images of a set of four other model cars, but similar to each other, were used with the same success at both auto-associative and hetero-associative recall.

Although particular embodiments of the invention have been described and illustrated herein, it is recognized that modifications and variations may readily occur to those skilled in the art. Consequently, it is intended that the claims be interpreted to cover such modifications and variations.

I claim:

1. An optical associative memory for auto-associative or hetero-associative recall utilizing Hamming distance as the similarity measure between an input image vector $V^{(k)}$ and a plurality of memory image vectors $V^{(m)}$ to find the best match in memory comprising means for polarizing light in a predetermined direction perpendicular to the direction of propagation of said light, a spatial light modulator for entering an input image vector $V^{(k)}$ based on polarization modulation of light from said polarizing means, an array of spatial light modulators for storing said plurality of memory image vectors, $V^{(m)}$, and a spatial light modulator for each memory image vector based on polarization modulation of light, means for receiving said image vector $V^{(k)}$ and optically replicating it into an array of identical image vectors, one replicated image vector for each spatial light modulator of said array of spatial light modulators for storing said plurality of memory image vectors, $V^{(m)}$, thereby to multiply said input image vector $V^{(k)}$ with each of said memory image vectors $V^{(m)}$ to produce product vectors $V^{(k)} \times V^m$, means for analyzing the polarization states of each product vector $V^{(k)} \times V^{(m)}$ and producing a separate beam of light for each memory image vector $V^{(m)}$ the intensity of which is proportional to the Hamming distance between said input image vector $V^{(k)}$ and said memory image vector $V^{(m)}$, means for producing an electrical signal in response to the product vector $V^{(k)} \times V^{(m)}$ having the shortest Hamming distance, an array of separate means for producing light, one for each product image vector $V^{(k)} \times V^{(m)}$, responsive to said Hamming distance detection means for emitting a beam of light in a spatial array position corresponding to the spatial position of the memory image vector $V^{(m)}$ in the product image vector $V^{(k)} \times V^{(m)}$ having the shortest Hamming distance, and means for storing an array of output memory image vectors spatially positioned for receiving light from said array of separate means for producing light images of stored image vectors as selected by illumination by said array of separate light producing means responding to said shortest Hamming distance signal, whereby a stored image vector may be displayed that best matches an input image vector.

2. An optical associative memory as defined in claim 1 wherein image vectors stored in said array of output image vectors are identical to said array of memory image vectors $V^{(m)}$ stored for comparison with said input image vector $V^{(k)}$ for auto-associative recall.

3. An optical associative memory as defined in claim 1 wherein image vectors stored in said array of output image vectors are distinct from but associated one for one with said array of memory image vectors $V^{(m)}$ stored for comparison with said input image vector $V^{(k)}$ for hetero-associative recall.

4. An optical associative memory as defined in claim 1 wherein said means for storing an array of output image vectors may be loaded with output image vectors selected from a set identical to said array of memory image vectors $V^{(m)}$ and a set distinct from but associated one for one with said array of memory image vectors, thereby selecting either auto-associative recall or hetero-associative recall.

* * * * *